United States Patent
Wilton

(10) Patent No.: US 10,620,301 B2
(45) Date of Patent: Apr. 14, 2020

(54) LIDAR SYSTEM AND METHOD EMPLOYING LATE-LOCK GEIGER MODE DETECTION

(71) Applicant: Princeton Lightwave, Inc., Cranbury, NJ (US)

(72) Inventor: Samuel Richard Wilton, Hamilton, NJ (US)

(73) Assignee: ARGO AI, LLC, Pittsburgh, PA (US)

( * ) Notice: Subject to any disclaimer, the term of this patent is extended or adjusted under 35 U.S.C. 154(b) by 371 days.

(21) Appl. No.: 15/479,153

(22) Filed: Apr. 4, 2017

(65) Prior Publication Data

US 2018/0364337 A1    Dec. 20, 2018

(51) Int. Cl.
| | | |
|---|---|---|
| G01S 7/00 | (2006.01) | |
| G01S 7/4865 | (2020.01) | |
| G01S 17/10 | (2020.01) | |
| G01J 1/02 | (2006.01) | |
| G01S 17/89 | (2020.01) | |

(52) U.S. Cl.
CPC ........... *G01S 7/4865* (2013.01); *G01J 1/0228* (2013.01); *G01S 17/10* (2013.01); *G01S 17/107* (2013.01); *G01S 17/89* (2013.01)

(58) Field of Classification Search
USPC ............................................... 356/4.01, 5.01
See application file for complete search history.

(56) References Cited

U.S. PATENT DOCUMENTS

| | | | |
|---|---|---|---|
| 7,301,608 B1 | 11/2007 | Mendenhall et al. | |
| 7,800,739 B2 * | 9/2010 | Rohner | G01S 7/487 356/5.01 |
| 9,516,244 B2 * | 12/2016 | Borowski | G01S 7/486 |
| 9,874,629 B2 * | 1/2018 | Kostamovaara | G01S 17/107 |
| 2009/0185159 A1 | 7/2009 | Rohner et al. | |
| 2013/0300838 A1 * | 11/2013 | Borowski | G01S 7/486 348/46 |
| 2015/0177369 A1 * | 6/2015 | Kostamovaara | G01S 17/107 356/5.08 |

FOREIGN PATENT DOCUMENTS

| | | |
|---|---|---|
| EP | 2469301 A1 | 6/2012 |
| EP | 2887096 A1 | 6/2015 |

OTHER PUBLICATIONS

Authorized Officer Stephen DAMP, International Search Report and Written Opinion dated Jul. 12, 2018 for PCT International Application No. PCT/US2018/026041, Jul. 12, 2018.

* cited by examiner

*Primary Examiner* — James R Hulka
(74) *Attorney, Agent, or Firm* — Kaplan Breyer Schwarz, LLP

(57) ABSTRACT

Disclosed are improved LiDAR systems methods employing late-lock Geiger mode detection. In sharp contrast to the prior art, a late-lock Geiger mode detection system and/or method utilizes a pulsed laser and asynchronous avalanche photodiodes with a holdoff time between photodiode arm pulses that are substantially equal to—but slightly less than—the laser pulse period. Preferably, such difference between the holdoff time and the pulse period is <10 nsec.

6 Claims, 4 Drawing Sheets

LIDAR SYSTEM AND METHOD EMPLOYING LATE-LOCK GEIGER MODE DETECTION

TECHNICAL FIELD

This disclosure relates generally to scanning optical ranging and detection systems and methods. More particularly, it pertains time-of-flight light detection and ranging (LiDAR) systems and methods employing late-lock Geiger mode detection.

BACKGROUND

The ability to measure distance and reflectivity of objects within an environment without physically touching those objects is of great interest to many fields. LiDAR—and more particularly time-of-flight (TOF) based LiDAR—is a distance range measurement technique in which a brief laser light pulse is emitted and a reflected light pulse is detected while the time between the emitted light pulse and the reflected light pulse is measured. This time of flight of the laser light pulse from the time it is emitted until its reflected pulse is detected corresponds to the distance between a LiDAR detector and an object.

SUMMARY

An advance is made in the art according to aspects of the present disclosure directed to a LiDAR system and method employing late-lock Geiger mode detection. In sharp contrast to the prior art, a late-lock Geiger mode detection system and/or method utilizes a pulsed laser and asynchronous avalanche photodiodes with a holdoff time between photodiode arm pulses that are substantially equal to—but slightly less than—the laser pulse period. In one illustrative embodiment, such difference between the holdoff time and the pulse period is <10 nsec.

This SUMMARY is provided to briefly identify some aspect(s) of the present disclosure that are further described below in the DESCRIPTION. This SUMMARY is not intended to identify key or essential features of the present disclosure nor is it intended to limit the scope of any claims.

The term "aspect" is to be read as "at least one aspect". The aspects described above and other aspects of the present disclosure are illustrated by way of example(s) and not limited in the accompanying drawing.

BRIEF DESCRIPTION OF THE DRAWING

A more complete understanding of the present disclosure may be realized by reference to the accompanying drawing in which.

DETAILED DESCRIPTION

Figure 1:
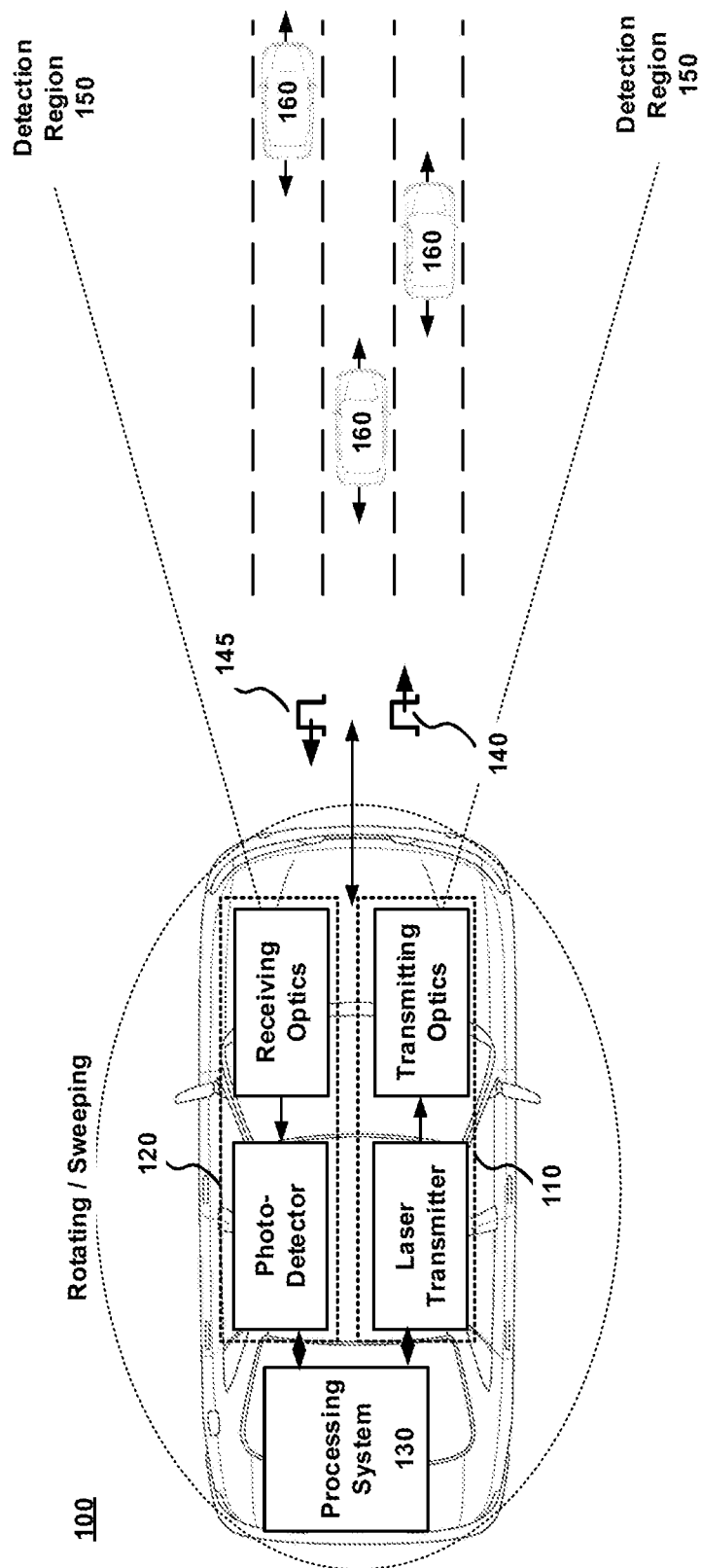
FIG. 1 shows a schematic diagram depicting an illustrative prior art Geiger-Mode, Avalanche Photo Diode (GmAPD) LiDAR system.

The following merely illustrates the principles of the disclosure. It will thus be appreciated that those skilled in the art will be able to devise various arrangements which, although not explicitly described or shown herein, embody the principles of the disclosure and are included within its spirit and scope. More particularly, while numerous specific details are set forth, it is understood that embodiments of the disclosure may be practiced without these specific details and in other instances, well-known circuits, structures and techniques have not been shown in order not to obscure the understanding of this disclosure.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the disclosure.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

The following terms are defined for use in this Specification, including the appended claims:

- detection region—also known as field of view is defined as an area of interest that is imaged during an image frame;
- image frame—also known as frame integration period (duration) and data integration period (duration) is defined as a time period during which a detection region is imaged. An image frame typically includes a plurality of detection frames;
- detection frame also known as laser pulse period or optical pulse period is defined as the time period between transmission of optical pulses from a transmitter; when used referring to time between GmAPD arm pulses, frame period is oftentimes used;

gate delay is defined as the time difference between the start time of a detection frame and the time at which a GmAPD-based receiver is armed to put it into Geiger mode; Note that synchronous APD pixels have a gate delay because they are periodically arming relative to a fixed, periodic reference, while asynchronous pixels do not have a gate delay because there is no reference to delay relative to;

gating period—also known as gate width or gate duration is defined as the period of time within a detection frame that a SPAD is armed to enable detection of a single photon of light; and sample region—also known as instantaneous field of view (IFOV) is defined as the region within a detection region that is sampled during an individual detection frame.

By way of some additional background, we begin by noting that advances in LiDAR systems and methods have enabled practitioners to scan large areas while collecting billions of data points, each with a precise latitude, longitude, and elevation (x, y, z) values within a local (relative) coordinate system. This aggregation of the billions of data points is referred to as a point cloud data set. Practitioners subsequently extract object locations from the point clouds data set and use that location information for subsequent decision making.

As is known, point cloud data sets may be collected by a GmAPD-based LiDAR system such as that illustratively shown in FIG. 1. As depicted in that FIG. 1, GmAPD-based LiDAR system 100 generally comprises a transmitter 110 including laser transmitter(s) and transmitting optics, receiver 120 including receiving optics and photo-detector (s), and processing system 130. As shown in FIG. 1, LiDAR system(s) may be mounted on movable platforms such as an automobile. While not specifically shown in FIG. 1, such LiDAR system(s) may be mounted on fixed or other movable platforms including land, sea, airborne and/or space vehicles. Still further, such platforms may be configured or individually combined to sweep or scan over a large volume such that a full 360 degree environmental view may be made.

Operationally, the transmitter periodically transmits interrogating signal(s) 140 into a detection region (or field of view) 150 from which they may be reflected back as return signal(s) 145. Generally, the interrogating signal(s) are a train of optical-pulses exhibiting a period T1 and a wavelength and intensity suitable for interrogating the detection region. The wavelength(s) of the interrogating signal(s) are oftentimes in the range of 900 nm to 2000 nm however, other usable wavelengths are known in the art.

In an exemplary GmAPD-based LiDAR system embodiment such as that illustrated in FIG. 1, the transmitter may include a laser source—such as a diode laser—which emits the optical pulses of interrogating signal(s) in response to drive signal(s) from—for example—the processing system. As each optical pulse of interrogating signal propagates through the detection region, objects 160 reflect a portion of a pulse's optical energy back toward system 100 as reflected optical pulse(s) in return signal(s) which may be detected by the receiver.

In contemporary embodiments, the receiver may include an array of GmAPD detector pixels (not specifically shown). As will be readily appreciated and understood by those skilled in the art, one particular advantage of GmAPDs is that they quickly produce an electrical pulse in response to the detection of even a single photon—allowing for sub-nsec-precision photon-flight-time measurements. When each pixel is armed, it may detect a low-intensity reflection of an interrogation signal (return signal) and output a signal to be detected and subsequently used by the processing system.

Note further that in illustrative embodiments the processing system may also provide gating signal(s) to pixels of the receiver (not specifically shown) that enables them to selectively detect photons received.

While the operational physics of avalanche photodiodes and in particular avalanche photodiodes operated in a Geiger-mode are known and understood, it is notable that the use of GmAPD detectors is generally not concerned with multiplication noise but rather with detection probability—namely the probability that an incident photon will produce a detection event. Such probability is the product of the quantum efficiency, which is the probability that a photon will be absorbed in the active region of the device, and the avalanche probability which is the probability that a photoelectron (or hole) will initiate an avalanche that does not terminate prematurely. Furthermore, it is noted that Geiger-mode detection events do not provide intensity information. An electrical pulse produced by the detection of a photon is indistinguishable from that produced by the detection of many simultaneously absorbed ones. Accordingly, a single thermally generated electron or hole can initiate an avalanche, leading to an electrical pulse that is indistinguishable from a photon detection. In LiDAR applications, such an event represents a false alarm whose probability needs to be minimized. Finally, since the electrical pulse from an APD is used in LiDAR to measure the arrival time of an optical pulse, a user must be concerned with the statistical variation of the time interval between pulse arrival and resulting electrical signal from the APD. Given these noted characteristics—and others—we describe herein techniques and associated methods for improving the reliability of detection data produced from GmAPDs and in particular those employed in LiDAR applications.

Figure 2:
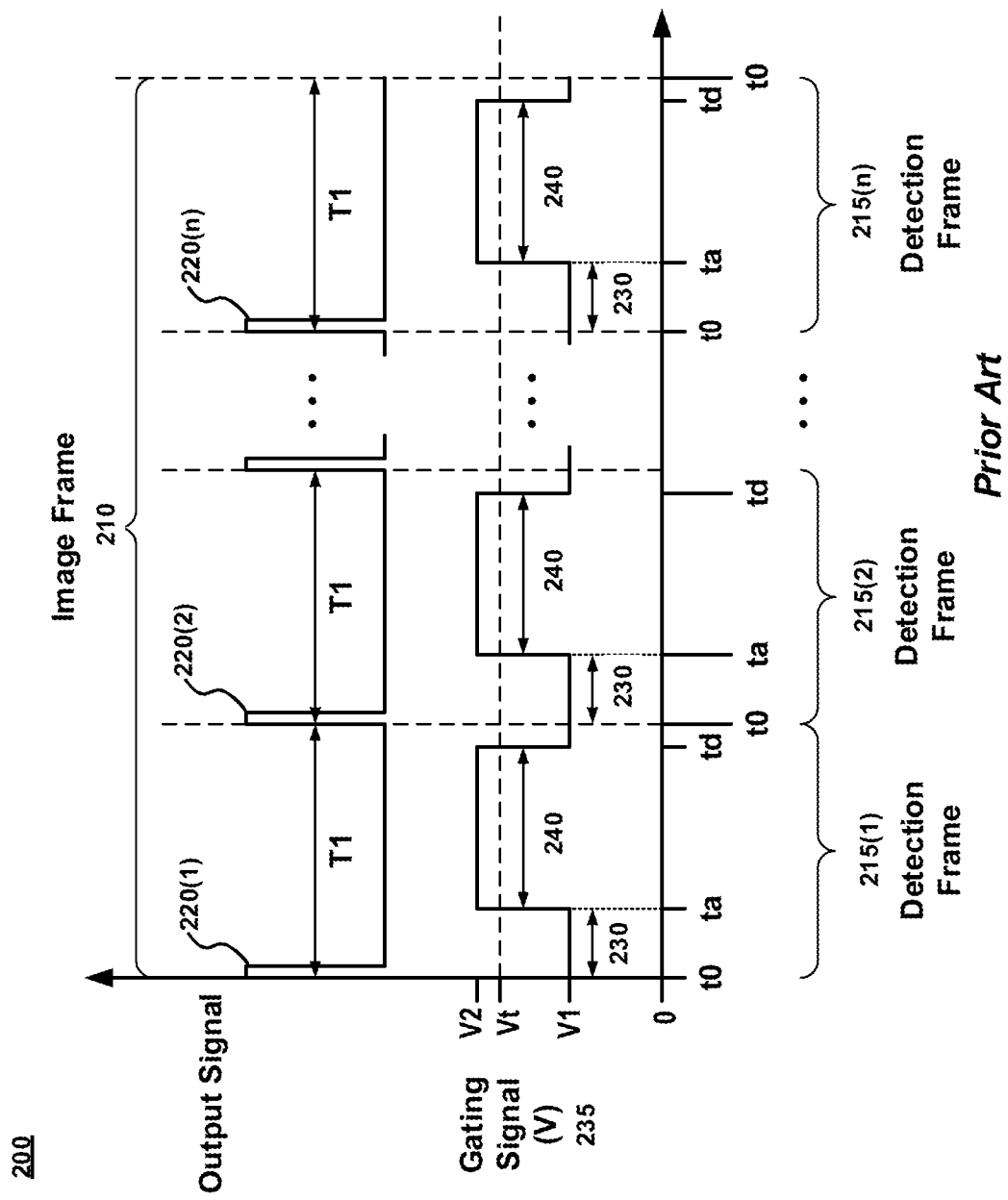
FIG. 2 shows a timing diagram including a plurality of waveforms illustrating generalized, prior art LiDAR pulse generation and detection.

Turning now to FIG. 2, there is shown an illustrative timing diagram including a plurality of waveforms of a representative image frame for a detection region such as that shown and described previously in FIG. 1. As may be observed from FIG. 2, an image frame 210 includes a number of substantially identical detection frames 215(1), 215(2), . . . 215(n). As further depicted in FIG. 2, each individual detection frame exhibits the same duration, which—in this illustrative example—is equal to the duration of period, T1, of the optical-pulse train of interrogating signal (140 in FIG. 1).

For a given image frame, each individual detection frame 215(1), 215(2), . . . 215(n) (referred to, collectively, as detection frames 215) has a start time, t0, which is coincident with the transmission of a respective optical pulse of an interrogating signal. In the illustrative example shown in FIG. 2, start time t0 is shown synchronized to the transmission of a respective optical pulse. For example, optical pulse 220(1) is transmitted at time t0 of detection frame 215(1), optical pulse 220(2) is transmitted at time t0 of detection frame 215(2), and optical pulse 220(n) is transmitted at time t0 of detection frame 215(n). Note that in some embodiments, the start time of each detection frame may different than the transmission time of its respective optical pulse and that the specific number of detection frames and optical pulses may vary from the number(s) shown in this illustrative example.

Continuing with our discussion of FIG. 2, it may be observed that at arming time ta, a gating signal 220 applied to the GmAPD-based pixels of a receiver (such as 120 of FIG. 1) raises the bias voltage of the GmAPD-based pixels from V1 to V2, where V2 is a voltage higher than a threshold voltage, Vt. This puts the pixels into Geiger mode, thus arming them to enable each pixel to detect receipt of a single photon of light. As shown in FIG. 2, arming time ta occurs at the end of a delay period 230.

During operation, gating signal 235 remains high (i.e., at V2) throughout gating period 240. Gating period ends at disarming time td, at which time the gating signal is reduced below threshold voltage Vt to voltage V1. As will be understood and appreciated by those skilled in the art, the time between ta and td (i.e., the duration of the gating period) generally defines the extent (range) of a region that is scanned during each detection frame. Upon reduction of gating signal below threshold voltage, avalanche events occurring in the GmAPDs are stopped (i.e., avalanche currents are quenched), enabling the GmAPDs to be rearmed to detect the arrival of another photon during the next detection frame.

Those skilled in the art will know that, typically, the GmAPD-based pixels of a receiver are disarmed slightly before the end of each detection frame (as shown in FIG. 2), thereby defining a hold-off time during which any trapped charges in the GmAPDs can detrap and recombine while the GmAPD is not in Geiger mode. As will be appreciated by those skilled in the art, such hold-off time advantageously avoids spurious avalanche events, such as dark counts due to afterpulsing.

At this point it will be readily understood and appreciated by those skilled in the art that during operation of such GmAPD-based LiDAR system it is critically important that the GmAPD-based receiver be armed and ready to receive a return signal when that signal actually arrives at the receiver. Given the real-world uncertainty with respect to distances of objects to be detected, knowing exactly when a return signal will arrive at the receiver is difficult or impossible to predict beforehand. Advantageously, methods, systems and techniques according to the present disclosure solve this problem.

Figure 3:
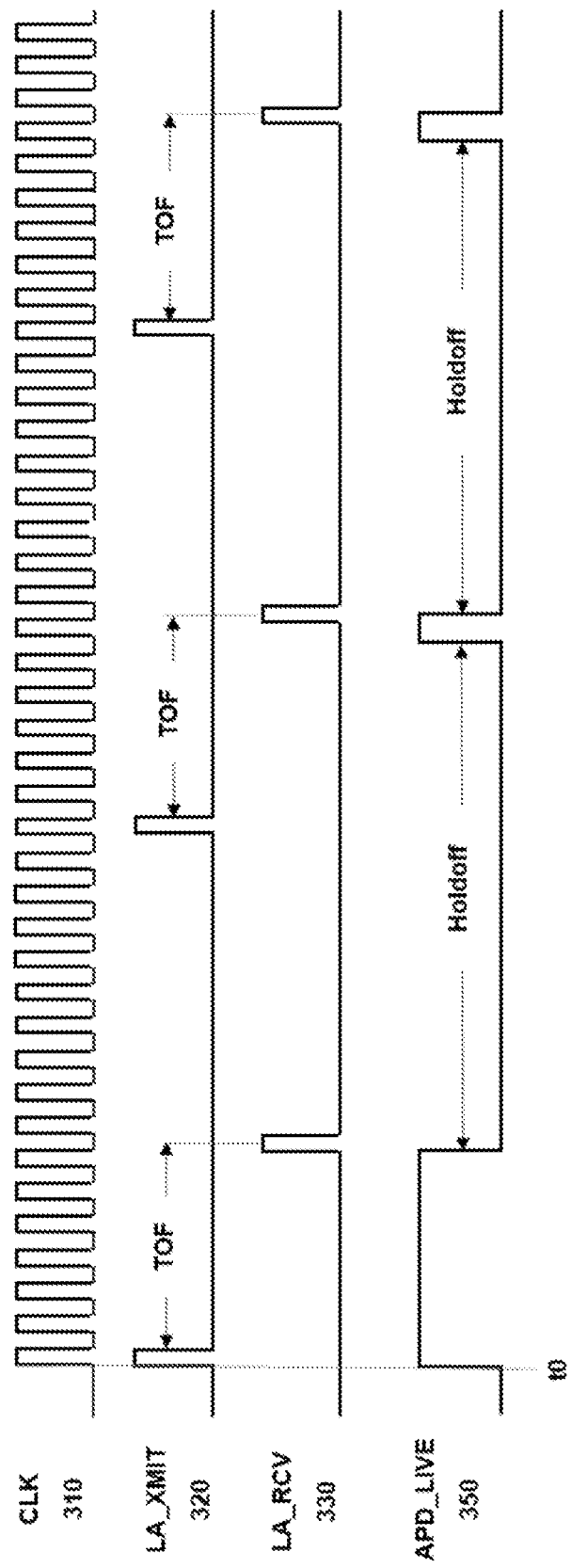
FIG. 3 shows a timing diagram including a plurality of waveforms illustrating Late-lock Geiger-mode LiDAR pulse generation and detection.

Turning now to FIG. 3, there is shown an illustrative timing diagram including a plurality of waveforms for a GMAPD-based LiDAR system according to aspects of the present disclosure. More specifically, FIG. 3 illustrates a timing clock (CLK) 310, a laser transmit (LA_XMIT) 320, a laser receive (LA_RCV) 330, and an avalanche photodiode live (APD_LIVE) 350 waveform(s).

With continued reference to FIG. 3, we note that the laser transmit signal (LA_XMIT) 320 initiates the generation of the interrogation signal(s) and that the laser receive (LA_RCV) 330 represents the arrival of return signal(s)—both described previously. As will be readily appreciated and understood by those skilled in the art, the time difference between laser transmit and laser receive is the time-of-flight (TOF) of the signal(s) from which the distance to objects may be determined.

Shown further in FIG. 3 are avalanche photodiode live (APD_LIVE) 350 waveforms. These waveforms illustrate the periods in which avalanche photodiodes are armed in Geiger mode (i.e., throught the effect of a gating signal described previously) and are prepared to respond—in an ideal case—to a single photon detection. As will be further appreciated by those skilled in the art—once armed and live—a Geiger mode avalanche photodiode will upon receipt of a single photon of sufficient energy, avalanche and output a signal so indicative. Finally, we note that the time period between the falling edge of the avalanche photodiode live waveform (APD_LIVE) 350 and the rising edge of the next avalanche photodiode live (APD_LIVE) 350 defines a "holdoff" period.

Accordingly, and as will be readily appreciated by those skilled in the art, "holdoff" period as that term is used in the context of the present disclosure is that period of time between quench of an APD and its subsequent re-arming and therefore becoming ready to respond to a single photon even.

As previously noted, a receiver (detector) does not know beforehand where a target of interest (object) is relative to the LiDAR system so it must "learn" where it is—by chance—when it detects the first return signal photon reflected back from the object. Such is accomplished by a late-locking Geiger mode detection scheme according to the present disclosure that advantageously employs asynchronous avalanche photodiodes and exhibits a holdoff time between APD quench and APD arm pulses that is substantially equal to, but slightly less than, the laser pulse period. This time difference in duration—between the arm pulse holdoff time and the laser pulse period—is known as synchronization delay.

To maximize LiDAR system performance, the synchronization delay should be as short as possible within the limits of detector jitter, laser jitter, and laser pulse width. In an illustrative embodiment according to the present disclosure, a synchronization delay of less than 10 nanoseconds is sufficient. Accordingly, such an illustrative synchronization delay may be represented by:

$$\text{Synchronization Delay} = (\text{Duration}_{LPP} - \text{Duration}_{HO})$$

and $$\text{Synchronization Delay} < 10 \text{ nsec}$$

We note at this point however, that while a synchronization delay of less than 10 nanoseconds generally works well, our teachings are not so limited. More particularly, other—longer—synchronization delays—will work with systems and methods according to the present disclosure also.

As may be appreciated, longer synchronization delays will allow less stringent timing tolerances for a detector and laser. Operationally—according to the present disclosure—when an avalanche photodiode is triggered by a return signal, the maximum arm time of the APD before a next signal is received will be equal to the synchronization delay—which limits the maximum possible noise integration time and reduces the probability of "blinding" from ambient noise. As will be readily appreciated by those skilled in the art, late lock methods according to the present disclosure results in a naturally aligning range gate.

Note that in a traditional design/use case employing an asynchronous APD, a holdoff time may be designed to be as short as possible—typically between 500 ns and 2 usec and that shorter times are generally desirable if a detector can rearm fast enough without suffering from excessive afterpulsing. Notwithstanding these generalities, systems, methods and techniques according to the present disclosure provide significant advantage.

We note further that in a traditional APD implementation, the shortest possible rearm time is constantly being pursued. By way of illustrative example, consider a scenario where an object being imaged is 300 meters away (2 usec round trip time) and the nose level is sufficiently high to cause the APD to avalanche multiple times before the reflected laser pulse is observed (e.g., 2 MHz count rate==avg of 4 noise counts per 2 us round trip time).

In such a scenario we note that the noise is distributed randomly, and the APD is constantly rearming as it detects so much residual noise at random with signals being detected only occasionally.

As will be appreciated by those skilled in the art, even if it was possible to rearm extremely fast (i.e., instantaneous rearming) it would not be a desirable schemeto employ because the detector so instantaneously rearmed would see a large amount of noise that would generate avalanches and output signals. Consequently a data processor would necessarily have to process correspondingly large amount(s) of data so produced. As as an illustrative example—a 2 MHz count rate detected across 1024 pixels results in an overall data rate of 2G events/second. For a 16-bit time resolution, this produces a >4 GB/s data bandwidth that need be processed.

With late locking methods and systems according to the present disclosure, no matter how large the noise rate is, and no matter how long the holdoff time needs to be to avoid afterpulsing, such late-locking systems and methods only receive the minimum amount of information signals required to observe valid TOF signals. Once lock according to the present disclosure has been established, the effective data rate is equal to the laser pulse rate. In the particular illustrative example noted above, the 400 kHz laser pulse rate across 1024 pixels with 16 bit time resolution results in a 400 MB/s data bandwidth—a 10× improvement!

Secondly, with traditional methods of data processing, there is no pattern for a computer to look for between subsequent avalanche detections to determine whether or not a laser signal has been sufficiently sampled. Coincidence processing involves incrementing histogram time-bins and bypassing all memory locations in the histogram to determine which time-bin has the greatest amplitude.

Advantageously, by employing late lock methods and systems according to the present disclosure, a digital signal processor (DSP) or other processing structures may look for inter-avalanche patterns to determine whether a signal has been observed/detected or not. If the measured time between arm/disarm events is sufficiently short—i.e., between the synchronization delay—for a sufficiently large number of pulses—where the number depends on desired confidence—it can be determined instaneously where the signal is located without requiring enormous computational processing of histogramming and coincidence processing. Schemes according to the present disclosure also exhibit the advantage that—since it can be processed in real time with instaneous results—the LiDAR can spend the minimum amount of time in data integration before moving on to a next detection section Finally, in traditional coincidence processing, the computational (memory) overhead of passing through the histogram bins for each possible time bin in each pulse is quite large. For example—consider the situation where the laser is pulsing at 400 kHz. For a 300 meter range, 2 us round trip time with 500 ps time bin resolutions—there exist 4000 distinct time bins in which a signal may reside. If the DSP is checking 4000 unique time bins at 400 kHz for 1024 pixels with 2 Bytes/bin, this would require a memory bandwidth of 3.2 TB/s ! While it is possible to significantly reduce this value by reducing TOF resolution—say 5 or 10 ns, even a 160 GB/s cumulative memory bandwidth is still very large. Accordingly, reducing these processing and/or computational "costs" is but one significant advantage of late lock systems, methods and techniques according to the present disclosure.

Figure 4:
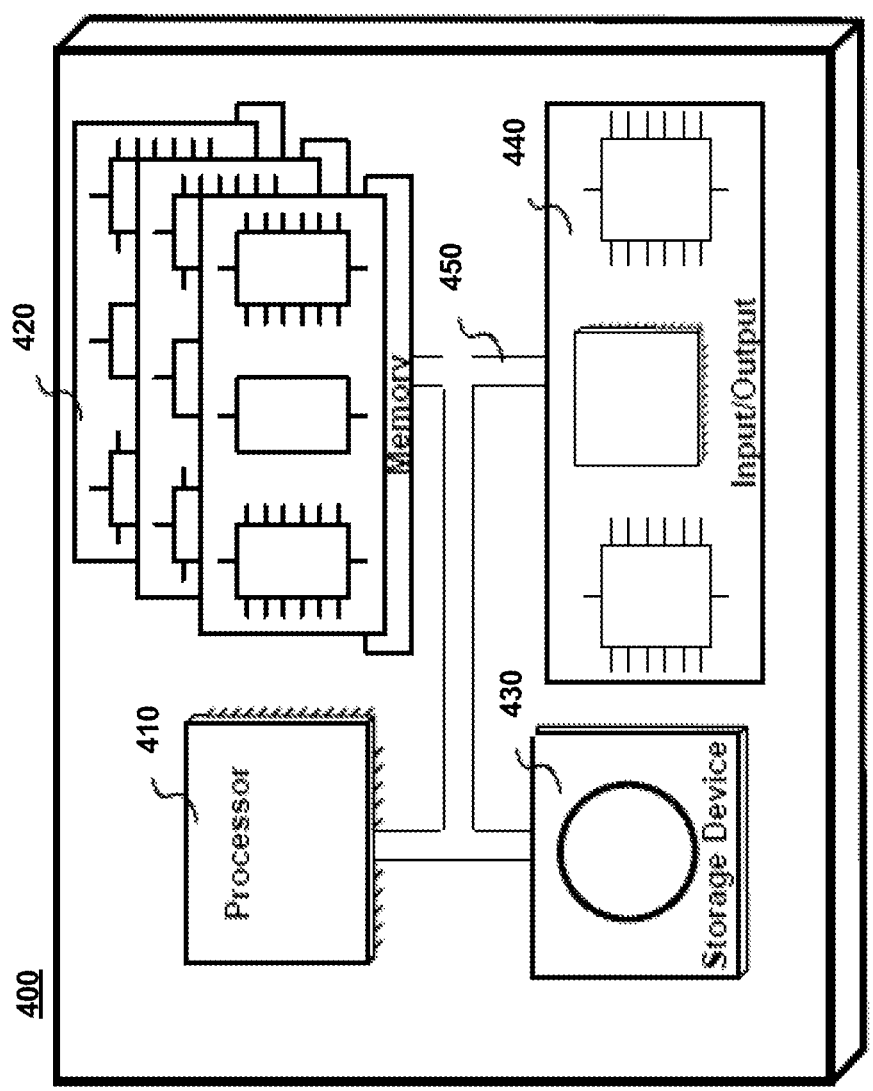
FIG. 4 is a schematic block diagram of an illustrative programmable computer system suitable for executing instructions implementing methods according to the present disclosure

Finally, FIG. 4 shows an illustrative computer system 400 suitable for implementing methods and incorporation into systems according to an aspect of the present disclosure. As may be immediately appreciated, such a computer system may be integrated into another system may be implemented via discrete elements or one or more integrated components. The computer system may comprise, for example a computer running any of a number of operating systems. The above-described methods of the present disclosure may be implemented on the computer system 400 as stored program control instructions.

Computer system 400 includes processor 410, memory 420, storage device 430, and input/output structure 440. When employed in systems and methods according to the present disclosure, one or more input/output devices may include transmitter(s), receiver(s), and optical control(s) along with light emitters, light receivers, timing and control functions, filters, etc, among other functions. One or more busses 450 typically interconnect the components, 410, 420, 430, and 440. Processor 410 may be a single or multi core.

Processor 410 executes instructions in which embodiments of the present disclosure may comprise steps described previously and/or outlined in one or more of the Drawing figures. Such instructions may be stored in memory 420 or storage device 430. Data and/or information may be received and output using one or more input/output devices.

Memory 420 may store data and may be a computer-readable medium, such as volatile or non-volatile memory. Storage device 430 may provide storage for system 400 including for example, the previously described methods. In various aspects, storage device 430 may be a flash memory device, a disk drive, an optical disk device, or a tape device employing magnetic, optical, or other recording technologies.

At this point, those skilled in the art will readily appreciate that while the methods, techniques and structures according to the present disclosure have been described with respect to particular implementations and/or embodiments, those skilled in the art will recognize that the disclosure is not so limited. Accordingly, the scope of the disclosure should only be limited by the claims appended hereto.

The invention claimed is:

1. A LiDAR system comprising:
a pulsed laser for providing and transmitting towards an object an optical signal which is reflected from the object thereby producing a reflected signal;
an avalanche photodiode (APD) photodetector for detecting the reflected signal;
a processing system for determining a time difference between when the optical signal is transmitted and when the reflected signal is detected;
SAID LiDAR SYSTEM CARACTERIZED BY:
a synchronization delay between APD quench and APD arm, the synchronization delay defined by the following relationship $$\text{Synchronization Delay} = (\text{Duration}_{LPP} - \text{Duration}_{HO})$$

wherein $\text{Duration}_{LPP}$ is the duration of the laser pulse period and DurationHO is the duration of a holdoff time; and
wherein laser pulse period is the time period between transmission of optical signal pulses, holdoff time is a time period before the end of a detection frame during which GmAPD photodetector elements are disarmed and trapped charges in the GmAPDs can detrap and recombine.

2. The system according to claim 1 further CHARACTERIZED BY:
the difference between the holdoff time and laser pulse period is<10 nsec.

3. A method of operating an avalanche photodiode (APD) LiDAR system comprising:
operating a pulsed laser such that an optical signal is directed towards an object and subsequently reflected from the object thereby producing a reflected signal;
detecting the reflected signal by a photodetector;
determining a time difference between when the optical signal is transmitted and when the reflected signal is detected;

SAID METHOD CHARACTERIZED BY:
a synchronization delay between APD quench and APD arm, the synchronization delay defined by the following relationship $$\text{Synchronization Delay} = (\text{Duration}_{LPP} - \text{Duration}_{HO})$$

wherein $\text{Duration}_{LPP}$ is the duration of the laser pulse period and DurationHO is the duration of a holdoff time; and
wherein laser pulse period is the time period between transmission of optical signal pulses, holdoff time is a time period before the end of a detection frame during which GmAPD photodetector elements are disarmed and trapped charges in the GmAPDs can detrap and recombine.

4. The method according to claim 3 further CHARACTERIZED BY:
the difference between the holdoff time and the laser pulse period is adjusted to be<10 nsec.

5. A non-transitory computer storage medium having computer executable instructions which when executed by a computer cause the computer to perform operations comprising:
operating a pulsed laser such that an optical signal is directed towards an object and subsequently reflected from the object thereby producing a reflected signal;
arming an avalanche photodiode (APD) photodetector to detect the reflected signal;
determining a time difference between when the optical signal is transmitted and when the reflected signal is detected; and
a synchronization delay between APD quench and APD arm, the synchronization delay defined by the following relationship $$\text{Synchronization Delay} = (\text{Duration}_{LPP} - \text{Duration}_{HO})$$

wherein $\text{Duration}_{LPP}$ is the duration of the laser pulse period and DurationHO is the duration of a holdoff time; and
wherein laser pulse period is the time period between transmission of optical signal pulses, holdoff time is a time period before the end of a detection frame during which GmAPD photodetector elements are disarmed and trapped charges in the GmAPDs can detrap and recombine.

6. The non-transitory computer storage medium according to claim 5 having computer executable instructions which when executed by a computer cause the computer to additionally perform operations comprising:
adjusting the holdoff time such that the difference between the holdoff time and the laser pulse period is adjusted to be<10 nsec.

* * * * *